E. P. WEBSTER.
UNIVERSAL ROLLER BEARING.
APPLICATION FILED JAN. 15, 1918.
1,346,147.
Patented July 13, 1920.
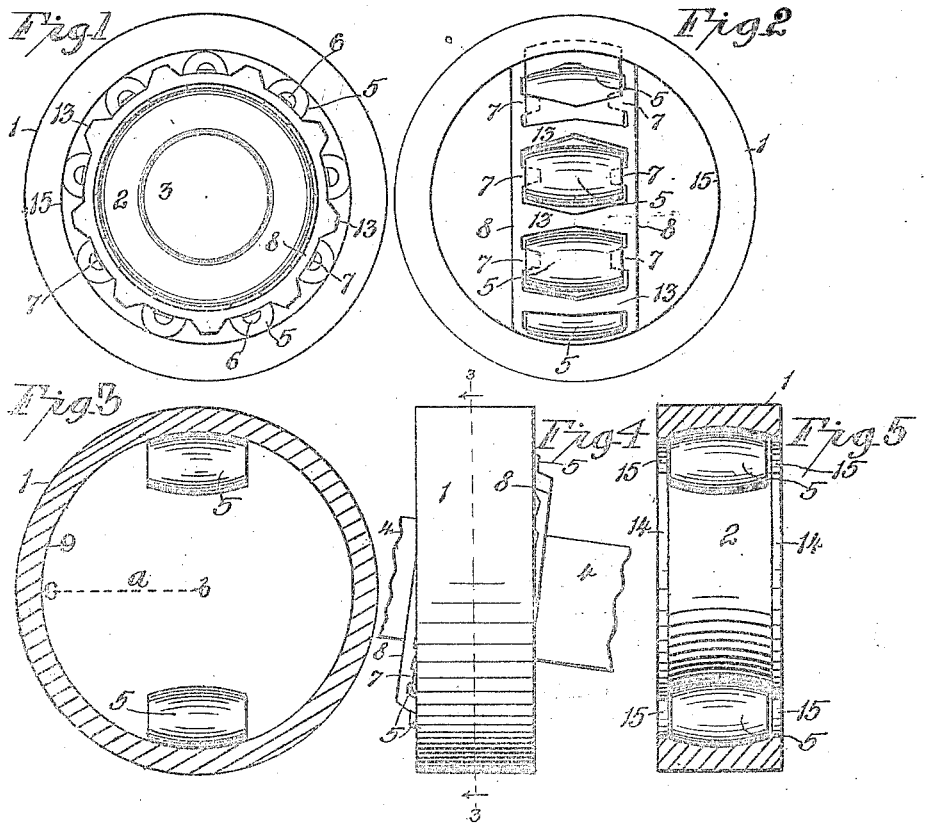

UNITED STATES PATENT OFFICE.

EDGAR P. WEBSTER, OF BRIDGEPORT, CONNECTICUT.

UNIVERSAL ROLLER-BEARING.

1,346,147.   Specification of Letters Patent.   Patented July 13, 1920.

Application filed January 15, 1918. Serial No. 211,987.

*To all whom it may concern:*

Be it known that I, EDGAR P. WEBSTER, citizen of the United States, residing at Bridgeport, in the county of Fairfield and State of Connecticut, have invented certain new and useful Improvements in Universal Roller-Bearings; and I do hereby declare the following to be a full, clear, and exact description of the invention, such as will enable others skilled in the art to which it appertains to make and use the same.

My invention relates to a universal roller bearings construction, and it consists in certain details of construction to be more fully set forth in the following specification.

Referring to the drawings:

Figure 1 represents a side elevation of the assembled roller bearing;

Fig. 2 indicates a side elevation of the outer race ring showing the rollers and their supporting mechanism positioned at a quarter turn thereto;

Fig. 3 is a central sectional view of the outer race ring on line 3—3 of Fig. 4, and two of the rollers located at a quarter turn with respect to the race rings;

Fig. 4 is an elevation of the outer race ring showing the rollers and their supporting mechanism slightly tilted therein, also broken view of the shaft on which the inner race ring is mounted;

Fig. 5 is a central sectional view of the outer race ring, full view of the inner race ring showing two of the rollers and the relative position the rollers occupy with respect to the two rings.

1 represents the outer race ring, and 2 the inner race ring, the latter having the central bore 3 adapted to receive the shaft 4. 5 are the rollers having the bore 6 adapted to receive the inturned fingers 7 of the skeleton frame 8. The purpose of these fingers is simply to maintain the proper spaced relation between the rollers, but do not form journals therefor. The frame or cage 8 loosely embraces the inner race ring 2.

The outer race ring has the inner circumferential track 9, Fig. 3. The longitudinally curved surface of the rollers and the semi-circular curves of the two race rings are of equal radius, and in this particular construction, the radius is one inch and a quarter, as indicated by the dotted lines $a$. But whatever may be the size of the roller bearing construction, these radii must in all cases be equal. In other words, they must equal $b$, $c$, Fig. 3, viz. one-half of the diameter of the outer race ring.

The rollers are located between the outer and inner race rings and bear equally against the curved surface of each, so that the rotation of the inner race ring 2 will rotate the several rollers and thus effect a frictionless roller bearing. The slightest deflection of the shaft 4 in any direction will tilt the inner race ring to conform thereto, the curved surface of the rollers, following the transverse curved surface of the rollers, will permit the race rings to rotate regardless of the angular position of the inner race ring with respect to the outer race ring.

The cage, rollers and inner race ring are assembled within the outer race ring with simply closing the sides of the cage sufficient to cause said sides to coincide with the vertical sides of the inner race ring and force the fingers 7 into the central bore of the rollers to maintain a fixed distance between the rollers as before mentioned. The sides of the cage are connected by the bridges 13, which bridges will be outwardly deflected, as shown, to compensate for this inward closing of the sides. The side flanges 14 of the inner race ring maintain the rollers therein.

When the cage 8 and the rollers are thus assembled within the outer race ring, they cannot be removed therefrom, when turned into the position shown in Fig. 2, as the diameter of the opening 15 of the outer race ring is less than the diameter of the highest point of the outer race ring. The inner race ring, with its accompanying cage and rollers, is thus capable of making a complete revolution in any direction within the outer race ring without being displaced therefrom, and the rollers will always have a working bearing surface against both rings whatever position they may assume with respect to the outer race ring. On swinging the inner race ring, the highest point of the curve of the rollers serves as a pivotal point, giving a "gimbal" like effect to the inner race ring.

A roller bearing constructed on the lines above described not only affords perfect freedom of movement in any direction, but is easily and economically assembled and possesses durable wearing qualities.

Having thus described my invention, what I claim is:—

1. In a roller bearing, an outer and an inner race ring, rollers interposed between the rings and having a recess in each end thereof, and a cage having sides connected by a peripheral portion, the latter formed with openings to receive the rollers, said cage being formed with fingers integral therewith and located at the ends of the openings in spaced relation to the sides of the openings, said cage being formed of sheet metal whereby upon applying pressure to the sides of the cage said sides will be caused to approach each other to effect entry of the fingers into the roller recesses and the bridges resultant from the openings will be deflected outwardly.

2. In a roller bearing, an outer and an inner race ring, rollers interposed between the rings and having a recess in each end thereof, and a cage having sides connected by a peripheral portion the latter formed with openings to receive the rollers, said cage being formed with fingers which extend inwardly into the openings and being formed of material so as to allow the sides of the cage to approach each other to effect entry of the fingers into the roller recesses upon applying pressure to the cage sides.

In testimony whereof I affix my signature.

EDGAR P. WEBSTER.